United States Patent [19]

Weiss

[11] Patent Number: 4,788,076

[45] Date of Patent: Nov. 29, 1988

[54] POWDERED LACQUER, ITS MANUFACTURE AND USE

[75] Inventor: Joern-Volker Weiss, Haltern, Fed. Rep. of Germany

[73] Assignee: Hüls Aktiengesellschaft, Marl, Fed. Rep. of Germany

[21] Appl. No.: 45,437

[22] Filed: May 4, 1987

[30] Foreign Application Priority Data

Jul. 17, 1986 [DE] Fed. Rep. of Germany ....... 3624177

[51] Int. Cl.$^4$ ...................... C08L 63/00; C08L 67/00; C09D 5/46
[52] U.S. Cl. ......................................... 427/27; 427/29; 427/375; 525/438; 525/523; 528/89; 528/90; 528/94; 528/108; 528/109
[58] Field of Search ................... 528/108, 109, 94, 89, 528/90; 525/523, 438; 427/27, 29, 375

[56] References Cited

U.S. PATENT DOCUMENTS

| | | | |
|---|---|---|---|
| 3,442,849 | 5/1969 | Tashlick | 528/89 |
| 3,519,602 | 7/1970 | Castro | 525/523 |
| 3,533,985 | 10/1970 | Lantz | 525/523 |
| 3,642,698 | 2/1972 | Green | 528/108 |
| 4,009,223 | 2/1977 | Noonan | 525/523 |
| 4,161,575 | 7/1979 | Seymour | 528/94 |
| 4,510,288 | 4/1985 | Meyer | 528/94 |

Primary Examiner—C. Warren Ivy
Attorney, Agent, or Firm—Oblon, Fisher, Spivak, McClelland & Maier

[57] ABSTRACT

The invention relates to powdered lacquers based on a mixture of epoxide compounds and optionally polyesters as well as salts of primary $C_{4-18}$aliphatic and cycloaliphatic-diamines with phosphoric acid and/or sulphuric acid as a hardener, as well as other additives and a method for the manufacture of flat finish coatings.

19 Claims, No Drawings

POWDERED LACQUER, ITS MANUFACTURE AND USE

BACKGROUND OF THE INVENTION

1. Field of the Invention

The invention relates to powdered lacquers based on a mixture of epoxide compounds and salts of inorganic acids and optionally polyesters with primary diamines as hardeners.

2. Discussion of the Background

There is great need in industry for powdered lacquers of all kinds. This is primarily due to the fact that solvents can be avoided in the application of powdered lacquers, and only small losses occur in use. Powdered lacquers are economical and not environmentally damaging.

Most known lacquers yield glossy finishes. Recently, however, there has been greater interest in flat finishes because they require significantly less cleaning than glossy finishes. In addition, it is often more advantageous to produce flat finishes for safety reasons.

The simplest method of obtaining a flat finish is to admix smaller or larger quantities of fillers, depending on the degree of flat effect desired, such as chalk, finely ground silicon dioxide, barium sulfate, or incompatible additives such as wax, or cellulose derivatives. However, these additives result in lacquer films with poor technical characteristics.

DE-PS No. 23 24 696 discloses a method for the manufacture of coverings with a flat finish in which a special hardener—the salt of cyclic amidines with certain polycarboxylic acids—is used. In fact, due to its exceptional technical characteristics only this method has been able to succeed in the marketplace. The method has since been improved several times (see DE-OS No. 30 26 455, OS No. 30 26 456 and German Patent Application No. P 35 11 998.5 of Apr. 2, 1985 "Hardeners for Powdered Covering Agents Based on Epoxy Resins").

Nevertheless, this method has some basic disadvantages. The required amidines are expensive and not always available in the necessary quantities. It would be desirable if more readily available basic compounds, like straight liquid diamines, could be used in a suitable form as hardeners for epoxide resins. The salts of these amines with the usual acids, however, in contrast to the amidine salts, are so stable that under the baking conditions common in the powdered lacquer industry, no adequate hardening of the epoxide resins takes place.

An aqueous coating system obtained through a reaction of a polyol-polyether epoxide with phosphoric acid anhydride is described in EP-PS No. 0 082 196. An aqueous system of this type does not suggest powdered lacquers and would not help in the search for lacquer systems which produce a flat effect.

SUMMARY OF THE INVENTION

Accordingly, an object of the present invention is to provide a powdered lacquer which is stable in storage.

Another object of the invention is to provide a powdered lacquer using hardeners which are capable of use both with epoxide resins as well as with the so-called hybrid system, i.e. mixed systems of epoxide and polyester resins.

Still, another object of the invention is a powdered lacquer using hardeners which are easy to obtain and manufacture, and are available in practically any quantities desired.

A further object of the invention is a powdered lacquer which yields a flat finish on hardening.

These objects and other objects of the present invention which will become apparent from the following specification have been achieved by the present powdered lacquer which is stable in storage, containing (a) at least one epoxide containing compound, wherein the compound contains on the average more than one epoxide group per molecule; (b) a nitrogen-containing salt, wherein the salt is prepared from phosphoric acid or sulfuric acid and a primary aliphatic or cycloaliphatic $C_{4-18}$ diamine; and (c) 1,4-diazabicyclo[2.2.2]-octane.

DETAILED DESCRIPTION OF THE PREFERRED EMBODIMENTS

The advantage of the powdered lacquers according to the invention is primarily that one need not rely on special nitrogen-containing compounds and adducts, which first must be synthesized. Rather one can employ compounds commonly in use which are commercially available.

The epoxide resins used in the present invention have more than one epoxide group per molecule on the average. They have a melting point above 40° C. The epoxide resins can be saturated or unsaturated, aliphatic, cycloaliphatic, araliphatic or heterocyclic.

Preferred epoxide resins include resins made from (i) epoxides of multiply unsaturated hydrocarbons, such as vinylcyclohexene; dicyclopentadiene; 1,3-cyclohexadiene; 1,4-cyclododecadiene; cyclododecatriene; isoprene; 1,5-hexadiene; butadiene; polybutadiene; divinylbenzene; etc;

(ii) epoxy ethers of polyvalent alcohols, such as ethylene glycol, propylene glycol and butylene glycol, glycerin, pentaerythritol, sorbitol, polyvinyl alcohols and thiodiglycols;

(iii) epoxy ethers of polyvalent phenols, such as resorcinol, hydroquinone, bis-(4-hydroxyphenol)methane, bis-(4-hydroxy-3,5-dichlorphenyl)-methane, 1,1-bis-(4-hydroxyphenyl)-ethane, 2,2-bis-(4-hydroxyphenyl)-propane, 2,2-bis-(4-hydroxy-3-methylphenyl)-propane, 2,2-bis-(4-hydroxy-3,5,5-trichlorophenyl)-propane, bis-(4-hydroxyphenyl)phenylmethane, bis-(4-hydroxyphenyl)-diphenylmethane, bis-(4-hydroxyphenyl)-cyclohexylmethane, 4,4'-dihydroxybiphenyl, 2,2'dihydroxybiphenyl; and (iv) N-containing epoxides, such as N,N-diglycidylaniline, N,N'-dimethyldiglycidyl-4,4'-diaminodiphenylmethane, and triglycidylisocyanurate.

Epoxides based on bisphenol A with an epoxide equivalent of 500 to 2,000 and a melting point of 70° to 140° C. have proven to be particularly suitable.

Suitable polyesters, added in quantities up to 45% relative to the weight of the epoxide compounds, include oligoesters of aliphatic; cycloaliphatic or aromatic polycarboxylic acids with aliphatic or cycloaliphatic diols, whereby both components have from 4 to 18 carbon atoms.

Aliphatic, cycloaliphatic or aromatic dicarboxylic or polycarboxylic acids, on the one hand, and aliphatic or cycloaliphatic diols on the other hand, are used to manufacture the oligoesters. The carboxylic acids and diols contain from 4 to 18 carbon atoms. In the case of diols, individual carbon atoms can also be replaced by oxygen atoms. Oxygen substitution is such that an oxygen atom must be separated in the chain from a hydroxyl group and/or from an additional oxygen atom by at least 2 carbon atoms.

Examples of dicarboxylic acids include succinic acid, glutaric acid, adipic acid, trimethyl adipic acid, azelaic acid, sebacic acid, decanoic acid, dodecanoic acid, fumaric acid, maleic acid and isophthalic acid. Examples of polycarboxylic acids include 1,3,5-benzene-tricarboxylic acid, 1,2,4-benzene tricarboxylic acid, 1,2,3-benzene-tricarboxylic acid, 1,5-naphthalene-dicarboxylic acid, 4,4'-benzophenonedicarboxylic acid, butanetetracarboxylic acid, cyclopentanetetracarboxylic acid, pyromellitic acid, 1,2,3,4-benzene-tetracarboxylic acid, 1,2,3,5-benzene-tetracarboxylic acid, and 3,4-dicarboxyl-1,2,3,4-tetrahydronaphthalene-1-succinic acid.

Examples of suitable diols include 1,3-butanediol; 1,4-butanediol; 2,3-butanediol; 1,5-pentanediol; 2,2-dimethyl-1,3-propanediol; 1,6-hexanediol; and 2,5-hexanediol as well as 1,12-dodecanediol.

The preparation of oligoesters is known (Sorensen and Campbell—"Preparative Methods of Polymer Chemistry," Interscience Publishers Inc., New York, 1961, pp. 111-127). Generally the manufacture takes place at temperatures up to 200° C. by condensation in the melt. The course of the reaction can be followed by titration of the excess carboxyl groups, so that the end of the reaction can be easily determined.

Sulfuric acid or phosphoric acid as well as mixtures thereof are used as inorganic acids, with phosphoric acid being preferred.

The primary diamines have an aliphatic or cycloaliphatic structure with 4 to 18 carbon atoms. Particularly suitable are (i) derivatives of cyclohexylamine, containing an additional aliphatic or cycloaliphatic amino group, particularly isophorondiamine (IPD); and (ii) aliphatic diamines with the basic structure of hexamethylenediamine, which can also be substituted with one or more lower alkyl groups, particularly 2,2,4- and/or 2,4,4-trimethylhexamethylene diamine (TMD).

The manufacture of the salts preferably takes place by reacting the inorganic acids with the above-mentioned diamines in an aqueous solution at a temperature of about 50° C. The quantity of the acid is adjusted in such a manner that at least one, and preferably at most two acid equivalents, react with one amino group.

The powdered lacquers according to the invention also contain 1,4-diazabicyclo-[2.2.2]-octane, preferably in a quantity of 0.5 to 1%, relative to the total weight of the formulation.

In the manufacture of the powdered coating agents, additional common additives, such as flow enhancers, pigments, dyes, fillers, catalysts, thixotropic agents, and UV and oxidation stabilizers can also be used. The quantity of these additives can vary within a wide range, relative to the quantity of the binding agent.

The manufacture of the coating takes place in such a manner that the individual components (epoxide resins, hardeners and, if desired, additives) are ground, mixed and extruded at from 90° to 110° C. After extrusion, the mixture is cooled and ground to a grain size of less than 100 microns.

The application to the substrate can take place according to known methods, such as electrostatic powder spraying, whirl sintering or electrostatic whirl sintering.

Subsequently, the applied coating is hardened for 5 to 35 minutes in a temperature range from 160° to 240° C., preferably for 10 to 20 minutes from 180° to 220° C.

Any substrate that can withstand the above-mentioned hardening temperatures is suitable for being coated with the powdered coating agents according to the invention, for example metals, glasses, ceramics or plastics.

The coatings manufactured with the aid of the hardeners according to the invention have a uniform structure and a flat finish. According to the testing method of Gardner (at 60°) finish grades as low as 14 can be attained. In an unexpected manner, other technical lacquer characteristics remain at a high level.

The technical lacquer characteristics were determined with the aid of the following testing methods:

Cupping (in mm) according to Erichsen (DIN 53 156)
Ball Impact Test according to Gardner (ASTM D 2794)
Grid Test (DIN 53 151)
Finish Degree according to Gardner at 60° (ASTM D 523)

Other features of the invention will become apparent in the course of the following descriptions of exemplary embodiments which are given for illustration of the invention and are not intended to be limiting thereof.

EXAMPLES

The manufacture of 200 g of hardener takes place in a 1 liter 3-neck flask, equipped with a mechanical stirrer, a condenser, a powder funnel and a heating mantle.

The water-soluble polyamines (e.g. IPD, TMD) are dissolved in 400 ml of completely deionized water. Under stirring, the acids are then added dropwise. Finally, the reaction mixture is stirred for 1 hour at 50° C.

The isolation of the resulting salt takes place by removing the solvent in a rotary evaporator and subsequent drying of the solid residue under a vacuum at 100° C. for five hours.

Manufacture of the Powdered Lacquer

The salts used as hardeners are first ground to a very fine powder with the aid of a rapid rotory mill. Subsequently, this powder is roughly mixed with the other powdered lacquer components (epoxide resin and optionally polyester, titanium dioxide, 1,4-diazabicyclo-[2.2.2]-octane, flow agents in the form of a 10% master batch, etc.) in a premixer and then extruded in a Busscokneader at 100° C. The cooled extrudate is ground to a fine powder, whereby the large components greater than 100 microns are separated out with a sieve. The thus-obtained powder is applied to sheet steel in an electrostatic powder spraying system at a voltage of 60 kv and baked in an air drying cabinet at temperatures between 180° and 220° C.

The following hardening salts were employed:

| No. | Polyamine/inorganic acid | mol ratio |
| --- | --- | --- |
| 1 | TMD/$H_3PO_4$ | 1:1 |
| 2 | TMD/$H_3PO_4$ | 2:3 |
| 3 | TMD/$H_3PO_4$ | 3.5:1.7 |
| 4 | IPD/$H_3PO_4$ | 1:1 |
| 5 | IPD/$H_3PO_4$ | 2:3 |
| 6 | IPD/$H_3PO_4$ | 3:2 |
| 7 | IPD/$H_3PO_4$ | 3:2.1 |
| 8 | TMD/IPD/$H_3PO_4$ | 0.5:1.5:2.55 |
| 9 | TMD/IPD/$H_3PO_4$ | 1.5:1.5:1.7 |
| 10 | IPD/$H_2SO_4$ | 1.5:1 |

In the manufacture of the powdered lacquers, the following epoxide resins and OH-group-containing polyester were employed:

| Epoxide resin 1 (EP 1) | |
|---|---|
| EP-equivalent weight | 850–940 |
| EP-value | 0.10–0.11 |
| Softening range | 80–100° C. |
| Epoxide resin 2 (EP 2) | |
| EP-equivalent weight | 730–840 |
| EP-value | 0.12–0.13 |
| Softening range | 94–106 |
| Polyester resin 1 (PE 1) | |
| Acid number | 47–57 |
| Glass transition temperature | 58° C. |

Epoxide resin 1 is a product of the company Shell A.G., Hamburg, and can be obtained commercially under the name Epikote ® 1004. Epoxide resin 2 is a product of the firm Dow Chemical Co., with designation DER ® 663.

Polyester resin 1 is a product of the firm DSM Resins, Zwolle, Netherlands, with the designation URALAC ® 2228.

TABLE 1

COMPOSITION OF THE POWDERED LACQUERS (IN PROPORTIONAL PARTS)

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | A | B | C |
| Hardener No. | 1 | 2 | 3 | 4 | 5 | 6 | 7 | 8 | 9 | 10 | 4 | 1 | 1 | 1 | |
| Hardener | 3 | 3 | 3 | 3 | 3 | 3 | 3 | 5 | 3 | 3 | 3 | 3 | 3 | 5 | 5 |
| Resin EP 1 | 56 | 56 | 56 | 56 | 56 | 56 | 56 | 54 | 56 | 56 | — | — | 56 | 54 | 54 |
| Resin EP 2 | — | — | — | — | — | — | — | — | — | — | 40.8 | 40.8 | — | — | — |
| Resin PE 1 | — | — | — | — | — | — | — | — | — | — | 15.2 | 15.2 | — | — | — |
| TiO 40 | 40 | 40 | 40 | 40 | 40 | 40 | 40 | 40 | 40 | 40 | 40 | 40 | 40 | 40 | |
| Flow Agent | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| 1,4-diazabicyclo-[2.2.2]-octane | 0.5 | 0.5 | 0.5 | 0.5 | 0.5 | 0.5 | 0.5 | 0.5 | 0.5 | 0.5 | 0.5 | 0.5 | 0 | 0 | 0 |

TABLE 2

HARDENING REQUIREMENTS AND MECHANICAL SPECIFICATIONS OF THE LACQUERS

| | Example | | | | | | | | | | | | | | |
|---|---|---|---|---|---|---|---|---|---|---|---|---|---|---|---|
| | 1 | 2 | 3 | 4 | 5 | 6 | 7 | 8 | 9 | 10 | 11 | 12 | A | B | C |
| Hardening Conditions | | | | | | | | | | | | | | | |
| Time (Minutes) | 15 | 15 | 15 | 15 | 15 | 15 | 15 | 10 | 15 | 15 | 10 | 15 | 15 | 25 | 15 |
| Temperature (°C.) | 200 | 200 | 200 | 200 | 200 | 200 | 200 | 200 | 200 | 200 | 200 | 200 | 200 | 180 | 200 |
| Mechanical Specifications | | | | | | | | | | | | | | | |
| Layer thickness | 45 | 50 | 60 | 65 | 50 | 50 | 50 | 60 | 55 | 60 | 55 | 60 | 50 | 50 | 55 |
| Mandrel Bending Test | <2 | <2 | 3 | 2 | 4 | <2 | 3 | 5 | <2 | <2 | 2 | 2 | <32 | 20 | 20 |
| Erichsen Cupping | 9.1 | 9 | 7.5 | 4.5 | 3.5 | 5.9 | 7.6 | 4.4 | 8.1 | 8.5 | 9.0 | 7.0 | 0.3 | 0.8 | 0.6 |
| Ball Impact | | | | | | | | | | | | | | | |
| direct | >80 | >80 | >80 | 80 | 50 | >80 | >80 | 80 | >80 | 80 | >80 | >80 | 20 | 40 | 40 |
| reverse | 20 | 20 | >80 | <10 | <10 | 20 | 20 | >10 | 20 | <10 | 20 | 10 | <10 | <10 | <10 |
| Finish at 60 degrees | 25 | 25 | 52 | 18 | 14 | 36 | 40 | 17 | 30 | 42 | 25 | 40 | 30 | 37 | 40 |

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A powdered lacquer which is stable in storage, comprising:
   (a) at least one epoxide containing compound having a melting point above 40° C., wherein said compound comprises on the average more than one epoxide group per molecule;
   (b) a nitrogen-containing salt in an amount effective as hardener, wherein said salt comprises a salt prepared from an acid and a base, said acid selected from the group consisting of phosphoric acid and sulfuric acid, and said base selected from the group consisting of primary $C_{4-18}$ aliphatic and $C_{4-18}$ cycloaliphatic diamines, at least one equivalent of said acid reacting with an amino group; and
   (c) 0.5 to 1 wt %, relative to the total weight of the lacquer, of 1,4-diazabicyclo-[2.2.2]-octane.

2. The lacquer of claim 1, wherein said epoxide containing compound has a melting point above 70° C.

3. The lacquer of claim 1, wherein said epoxide containing compound is an epoxide resin comprising epoxides selected from the group consisting of epoxides of multiply unsaturated hydrocarbons, epoxy ethers of polyvalent alcohols, epoxy ethers of polyvalent phenols, and nitrogen-containing epoxides.

4. The lacquer of claim 1, further comprising a polyester.

5. The lacquer of claim 4, wherein said polyester is present in quantities up to 45 wt. % relative to said epoxide containing compound.

6. The lacquer of claim 4, wherein said polyester is prepared from a polycarboxylic acid and a diol, wherein said polycarboxylic acid is a member selected from the group consisting of $C_{4-18}$ aliphatic, $C_{4-18}$ cycloaliphatic and $C_{4-18}$ aromatic polycarboxylic acids, and wherein said diol is a member selected from the group consisting of $C_{4-18}$ aliphatic and $C_{4-18}$ cycloaliphatic diols.

7. The lacquer of claim 4, wherein said polyester has an average molecular weight below 2,500.

8. The lacquer of claim 1, wherein said base is a derivative of cyclohexylamine.

9. The lacquer of claim 8, wherein said base is isophorone diamine.

10. The lacquer of claim 1, wherein said base is an alkyl-substituted hexamethylene diamine.

11. The lacquer of claim 10, wherein said diamine is a member selected from the group consisting of 2,2,4- trimethylhexamethylene diamine and 2,4,4-trimethylhexamethylene diamine.

12. The lacquer of claim 1, further comprising additives selected from the group consisting of flow enhancers, pigments, dyes, fillers, catalysts, thixotropic agents, UV stabilizers and oxidation stabilizers.

13. The lacquer of claim 1, wherein said lacquer has a grain size smaller than about 100 micron.

14. A method for the manufacture of a flat finish coating, comprising the steps of:
(i) mixing at least one epoxide-containing compound, a nitrogen-containing salt in an amount effective as hardener, and 0.5 to 1 wt %, relative to the total weight of the coating, of 1,4-diazabicyclo-[2.2.2]-octane;
(ii) extruding said mixture at a temperature between about 160°–240° C.; cooling said extrusion, and grinding said cooled extrusion;
(iii) applying said ground mixture to a substrate to coat said substrate; and
(iv) heating said coated substrate at a temperature from about 160°–240° C. for about 5–35 minutes, wherein said epoxide-containing compound comprises in the average more than one epoxide group per molecule having a melting point above 40° C., and said nitrogen-containing salt comprises a salt prepared from an acid and a base, said acid selected from the group consisting of phosphoric acid and sulfuric acid, and said base selected from the group consisting of primary $C_{4-18}$ aliphatic and $C_{4-18}$ cycloaliphatic diamines, at least one equivalent of said acid group reacting with an amino.

15. The method of claim 14, wherein said heating step is conducted at a temperature from about 180°–220° C. for 10–20 minutes.

16. The method of claim 14, wherein said applying step is performed by electrostatic powder spraying, whirl sintering, or electrostatic whirl sintering.

17. The method of claim 14, wherein said substrate is a member selected from the group consisting of metals, glasses, ceramics, and plastics.

18. The method of claim 14, further comprising adding an additive selected from the group consisting of flow enhancers, pigments, dyes, fillers, catalysts, thixotropic agents, UV stabilizers, and oxidation stabilizers during said mixing step.

19. The method of claim 14, wherein said ground extrusion has a grain size less than 100 micron.

* * * * *